(12) United States Patent
Endo

(10) Patent No.: US 7,319,881 B2
(45) Date of Patent: Jan. 15, 2008

(54) INFORMATION DELIVERING METHOD, INFORMATION DELIVERING DEVICE, INFORMATION DELIVERY PROGRAM, AND COMPUTER-READABLE RECORDING MEDIUM CONTAINING THE INFORMATION DELIVERY PROGRAM RECORDED THEREON

(75) Inventor: Hitoshi Endo, Toyonaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 411 days.

(21) Appl. No.: 10/409,097

(22) Filed: Apr. 9, 2003

(65) Prior Publication Data

US 2003/0195009 A1    Oct. 16, 2003

(30) Foreign Application Priority Data

Apr. 12, 2002 (JP) .............................. 2002-110450

(51) Int. Cl.
*H04Q 7/20* (2006.01)
*H04M 11/00* (2006.01)

(52) U.S. Cl. ..................................... 455/466; 455/403
(58) Field of Classification Search ................ 455/466, 455/414.3, 403; 379/67.1, 88.04, 114.13
See application file for complete search history.

(56) References Cited

U.S. PATENT DOCUMENTS 5,363,147 A * 11/1994 Joseph et al. ................ 348/738
5,448,625 A * 9/1995 Lederman .................... 379/112
6,178,231 B1 * 1/2001 Nabkel ..................... 379/88.19
2002/0000984 A1   1/2002 Asai et al.
2002/0103647 A1 * 8/2002 Houplain
2003/0195801 A1 * 10/2003 Takakura et al. ............. 705/14
2006/0095512 A1 * 5/2006 Noma ........................ 709/203

FOREIGN PATENT DOCUMENTS

| JP | 7-184112 A | 7/1995 |
|---|---|---|
| JP | 10-112829 A | 4/1998 |
| JP | 2001-24786 A | 1/2001 |
| JP | WO 01/15410 | * 3/2001 |
| JP | 2001-325522 A | 11/2001 |
| JP | 2001-352403 A | 12/2001 |
| JP | 2002-058878 | 2/2002 |
| JP | 2002-101206 | 4/2002 |
| WO | WO 03/041440 | * 5/2003 |

* cited by examiner

*Primary Examiner*—William J. Deane, Jr.
(74) *Attorney, Agent, or Firm*—Nixon & Vanderhye, PC

(57) ABSTRACT

An example information delivering device includes a conversation relaying section for relaying conversation data between users of two or more information terminals. The conversation data corresponds to a conversation between the respective users of the information terminals. An additional information delivering section adds audio data such as advertisements and music to the conversation data so that the audio data and the conversation data can be reproduced simultaneously by one or more of the information terminals, while the conversation relaying section relays the conversation data between the information terminals. This allows the information delivering device to deliver additional information such as advertisements and music during a telephone conversation.

26 Claims, 11 Drawing Sheets

INFORMATION DELIVERING METHOD, INFORMATION DELIVERING DEVICE, INFORMATION DELIVERY PROGRAM, AND COMPUTER-READABLE RECORDING MEDIUM CONTAINING THE INFORMATION DELIVERY PROGRAM RECORDED THEREON

FIELD OF THE INVENTION

The present invention relates to an information delivering method and information delivering device for delivering information such as advertising and music to an information terminal such as a mobile phone.

BACKGROUND OF THE INVENTION

The following are examples of prior art that relate to an advertising method using a telephone.

Japanese Unexamined Patent Publication No. 2001-24786 (published on Jan. 26, 2001) discloses a "call-holding device for telephone set and advertising method using the device." This device uses a message having an advertisement previously recorded therein in a call-holding device for a telephone set, as a holding tone during a hold period or during call redirection.

Japanese Unexamined Patent Publication No. 2001-352403 (published on Dec. 21, 2001) discloses an "advertisement method and advertisement system utilizing mobile telephone." In this method and system, incoming voice data as well as an incoming call signal are received at the reception end, ring tones are used for advertising as advertisement ring tones, and discounts are provided according to the use of the advertisement ring tones.

Thus, the conventional advertising method using a telephone occupies telephone users for a predetermined period of time so as to make them listen to advertisements.

As prior art that relates to a method for offering information to receivers of the offered information (telephone users, etc.) without occupying them, the following are prior art using, for example, a subliminal effect.

Japanese Unexamined Patent Publication No. 112829/1998 (Tokukaihei 10-112829; published on Apr. 28, 1998) discloses an "image broadcast system and television receiver." In this system, a subliminal image is used to avoid erasure of an advertising image, to provide value added information, and to figure out how big an audience appreciation rating is.

Japanese Unexamined Patent Publication No. 184112/1995 (Tokukaihei 7-184112; published on Jul. 21, 1995) discloses a "television receiver." In this receiver, in order to eliminate mental fatigue of a viewer, a picture to be displayed on the receiver is inserted or music is aired for a moment of time.

In addition, the following are examples of prior art that relate to a method for offering information to information terminals such as mobile phones.

Japanese Unexamined Patent Publication No. 2001-325522 (published on Nov. 22, 2001) discloses an "internet live text radio advertisement." In this system, character information is displayed on a display screen (status bar) of an information terminal, and audio information such as music is also offered.

Japanese Unexamined Patent Publication No. 2001-211270 (published on Aug. 3, 2001) (counterpart publication: U.S. Patent Application Publication No. 2002/0000984A1) discloses an "electrical device, advertisement means to electric device, fee charging system and fee charging method." In this system, a user can receive discounts on the purchase of the electrical device and discounts on the usage charge by displaying advertisements on a display panel of a mobile phone, etc.

As described above, the conventional advertising method using a telephone replaced ring tones and holding tones that are not speech with advertisements. Further, a conventional method is known for muting an audio output of music or radio during reception of a call.

However, the conventional advertising method just replaces ring tones and holding tones with advertisements, which makes it difficult to air lengthy advertisements or a plurality of advertisements.

SUMMARY OF THE INVENTION

An object of the present invention is to provide an information delivering method and information delivering device which can deliver information such as advertisements to a mobile phone or the like while a telephone call is in progress. Another object of the present invention is to provide an information delivery program which realizes the above information delivering device, and a computer-readable recording medium having the information delivery program stored thereon.

In order to achieve the above object, an information delivering method of the present invention includes the step of (a) relaying conversation data between first and second information terminals, the conversation data corresponding to a conversation between respective users of the first and second information terminals. The method further includes the step of (b) adding audio data to conversation data which is sent to at least one of the first and second information terminals so that the audio data and the conversation data can be reproduced simultaneously by the at least one of the first and second information terminals.

Further, an information delivering device of the present invention includes a conversation relaying section for relaying conversation data between first and second information terminals, the conversation data corresponding to a conversation between respective users of the first and second information terminals. The device further includes an audio adding section for adding audio data to the conversation data so that the audio data and the conversation data can be reproduced simultaneously by one or both of the first and second information terminals, while the conversation relaying section sends the conversation data from one of the information terminals to the other.

According to the above method and arrangement, when conversation data of a telephone conversation between a user of mobile phone, or the like (a first information terminal) and another party (a second information terminal) are relayed by switching equipment or the like in a mobile phone service provider, the conversation data sent in any one or both directions (to/from the user from/to the other party) is transmitted with separately prepared audio data which is added to the conversation data so that they can be reproduced simultaneously.

Therefore, it is possible to air additional audio information, such as advertisements and music, like background music during a telephone conversation between mobile phones, and other devices. This allows additional information to be reproduced for an overwhelmingly long time as compared to the time period for receiving a call or holding a call. Thus, it is possible to air a lengthy advertisement or a plurality of advertisements for a certain period of time (during one telephone conversation). In addition, information terminals used by the user and other party need only include the same functions as a conventional information terminal and do not require special functions.

In this respect, it was common conventionally that users disliked sound other than voices to be aired during a telephone conversation. Therefore, audio information, such as advertisements, was not aired like background music during a telephone conversation between users of mobile phones. However, even during a telephone conversation, the user usually enjoys listening to music, live sports broadcasts, news, etc. from a radio or compact disc player by his side. That is, information delivery during a telephone conversation was a blind spot in conventional advertising methods, but it has plenty of potential if a twist is added.

Further, according to the present invention, not only a user of a mobile phone, or the like but also another party can listen to information such as advertisements and music. In this respect, conventionally, only a user who receives an information delivery can listen to the information. However, the user sometimes wants to listen to music, live sports broadcasts, news, etc. with the other party during a telephone conversation.

As described above, according to the present invention, it is possible to deliver audio information, such as advertisements and music, to information terminals such as mobile phones in a flexible manner, which enables an information delivery service that is richer than ever before.

For a fuller understanding of the nature and advantages of the invention, reference should be made to the ensuing detailed description taken in conjunction with the accompanying drawings.

DESCRIPTION OF THE EMBODIMENTS

The following will explain one embodiment of the present invention with reference to the drawings.

Figure 2:
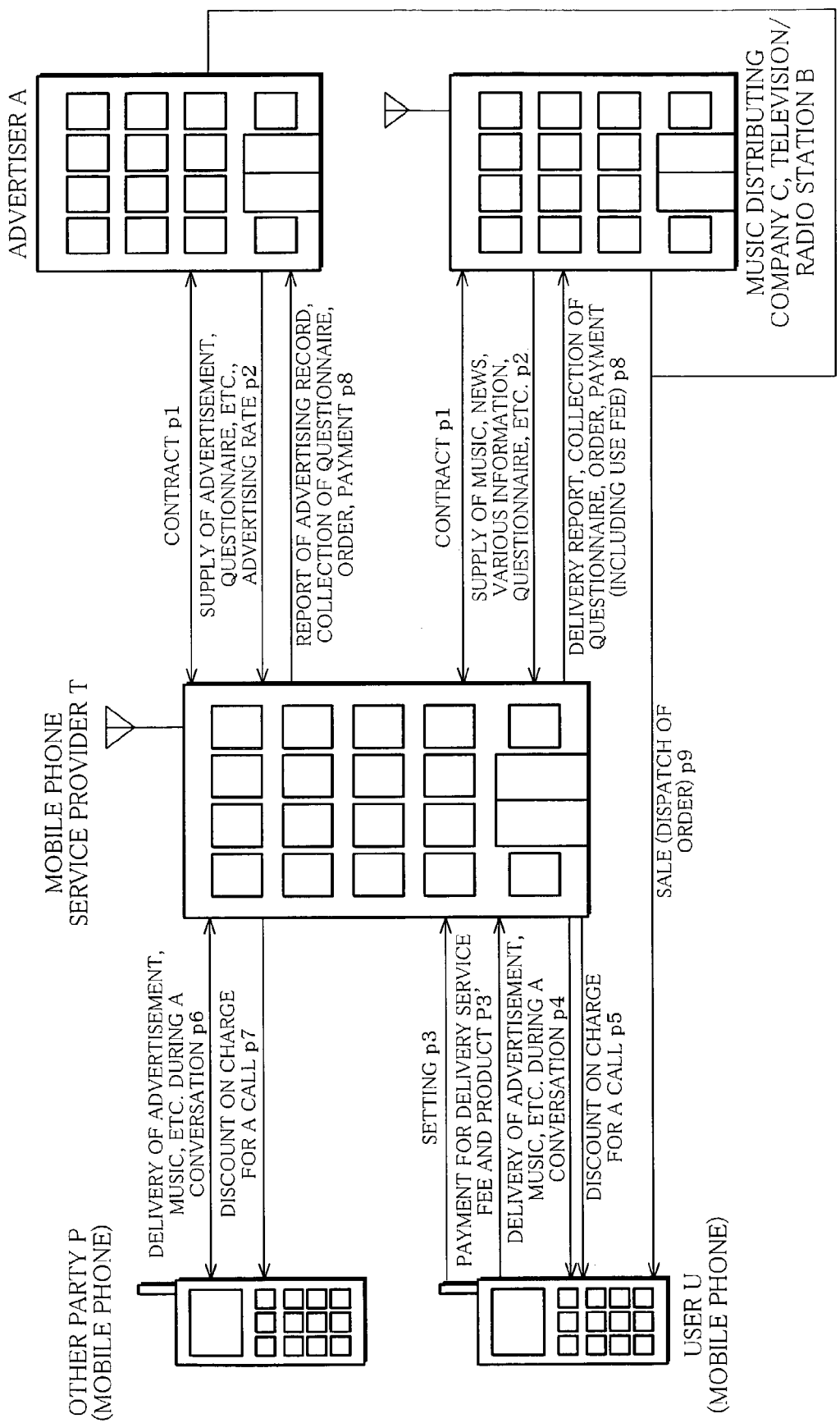
FIG. 2 is an explanatory view schematically showing an information delivery service according to the information delivery system shown in FIG. 1.

FIG. 2 is an explanatory view schematically showing an information delivery service for delivering information such as advertisements and music using an information delivering method according to the present embodiment.

The above information delivery service is a service that offers information such as advertisements and music, by audible sound like background music or by inaudible sound, for mobile phones (user U (a user of the mobile phone, etc.) and other party P) that have signed up in advance for the service. The delivery of information is performed during their telephone conversation. This information, such as advertisements and music, is solicited from information suppliers including an advertiser A such as an advertising broker, shop, or manufacturer; a television/radio station B; or a music distributing company C.

As shown in FIG. 2, in the case of the delivery of advertisements by a mobile phone service provider T, the mobile phone service provider T makes a contract in advance with the advertiser A regarding content of an advertisement, a charge for the advertisement (advertising rate), and a manner of payment for the charge (p1). After the contract, the advertiser A transmits audio data, etc. and a questionnaire over the Internet to the mobile phone service provider T and pays the mobile phone service provider T for the advertisement (p2). The audio data, etc. is to be delivered in an advertisement.

The mobile phone service provider T, which receives the audio data, etc. of the advertisement, stores this data in a database (additional information storage section 41 in FIG. 3), collects a user U who wants to receive an advertisement delivery, and sets delivery conditions, etc. for the user (p3). Here, in the case in which the information delivery service is a fee-based service, the user U pays for the service (p3').

After the setting of delivery conditions, etc. for the user, the mobile phone service provider T crosses audio data of the advertisement with the telephone conversation between the user U and an unspecified number of other parties P (p4: conversation relaying step and audio adding step). At this moment, the other party P receives the same advertisement as that set for the user U during a telephone conversation with the user U (p6: conversation relaying step and audio adding step). Incidentally, the other party P may refuse to receive the advertisement during the telephone conversation or preset a refusal so that receiving the advertisement can be refused. Moreover, in the case in which the other party P is also a user who signs on for the information delivery service like the user U, the mobile phone service provider T switches delivery conditions to delivery conditions set for the other party P so that the delivery to the other party P can be performed according to the conditions for the other party P.

The mobile phone service provider T causes a mobile phone to display link data for a Web site of the advertiser A and questionnaire data, on a display screen for setting the information delivery service and on a display screen during a telephone conversation. The mobile phone service provider T offers a discount (including cashback) on a charge for a call made using a mobile phone for the user U and other party P in accordance with a content of the conditions set on the information delivery service, a conversation time during which delivered information has been received, a sound volume of the audio data, access to the Web site of the advertiser A, answers to the questionnaire, etc. (p5, p7). Of course, the advertiser A can offer the user U and other party P a discount service on the purchase of products featured in the advertisement.

Further, in case of the delivery of fee-based information other than advertisements by the mobile phone service provider T, for example, the mobile phone service provider T makes a contract in advance with the television/radio station B and music distributing company C regarding content of information to be delivered and a charge for the information, and a manner of payment for the charge (p1). After the contract, the music distributing company C transmits music data, etc. to the mobile phone service provider T over the Internet (p2). The mobile phone service provider T registers received music data in a database (additional information storage section 41 in FIG. 3). Note that, this step is performed every time a new piece of music is published.

The television/radio station B, after the contract with the mobile phone service provider T, has constant access to the Internet so as to enable information such as news, etc. to be delivered at any time via the mobile phone service provider T (p2). This allows the television/radio station B to deliver various kinds of information such as news and live broadcasts of current sports games.

For the user U, the payment of the charge (use fee) for the service can be processed in such a manner that the use fee is added to the charge for a call made using the mobile phone (p3').

Even in the case of the delivery of information other than advertisements, the other party P receives the same delivered information (audio data) as that set for the user U during a telephone conversation with the user U. In such a case, there is no fee (use fee) for other party P's receipt of various kinds of information such as music. However, unlike the delivery of advertisements, the other party P does not receive a service such as cashback, by listening to the information with the user U.

Moreover, the mobile phone service provider T reports past records of the delivery by the information delivery service and the results of questionnaires. Further, the mobile phone service provider T orders and pays for products featured in the advertisement and music data as an intermediary for the delivered information suppliers (p8). Finally, the products are transmitted/sent to the user U in a conventional manner from the delivered information suppliers such as the advertiser A, the television/radio station B, and the music distributing company C (p9). Procedures such as discounting, cashback, and payment of the charge for the products are made to/by the user U and the other party P through a financial institution which is designated at the time of sign-up to the mobile phone service provider T.

The foregoing information delivery service has the following advantages. The user U can get a discount on the charge for a call made using the mobile phone and a discount (cashback) on products purchased. Further, the other party P can receive a service such as cashback from the mobile phone service provider T.

Further, the information suppliers can obtain, in real time, a report on the past record of the delivery of information such as advertisements. The foregoing information delivery system is a bi-directional information delivery system and information gathering system using the Internet, which can receive inquiries, answers to the questionnaires, and orders from the user U. Various kinds of information that is passed in real time to systems of the delivered information suppliers such as the advertiser A are registered in the database after a process such as classification. Therefore, the delivered information suppliers can judge clearly the effectiveness of the advertisement, etc. so that a user fee (such as an advertising rate) for the information delivery service can be paid according to the effectiveness.

On the other hand, the mobile phone service provider T can supply the material for the judgment of the effectiveness of the advertisement, etc. and set the use fee (advertising rate) for the information delivery service according to the effectiveness. In addition to the use fee for the information delivery service, the mobile phone service provider T can obtain a profit margin, etc. by offering various additional services such as providing link information to the mobile phone and conducting questionnaires.

Note that, the foregoing information delivery service is available whichever of the user U or the other party P initiates a call. Specifically, the user U can use the information delivery service in the case when the user U initiates a call to the other party P as well as when the user U receives a call from the other party P. The other party P can also use the information delivery service in a similar manner.

Further, audio data which an information delivering device 10 receives from the information suppliers may be data containing a sound itself, such as a WAV file, or data which can be converted into data containing a sound itself by an information delivering device 10 or an information terminal 80, so as to be outputted from the information terminal 80. For example, it may be data which specifies a WAV file stored in advance in the information delivering device 10.

The following description will assume that a communication network N is the Internet in the present embodiment; however, the present invention is not limited to this. Further, the way in which the information suppliers provide the delivered information is not limited to transmission via the communication network N.

Further, the following description will assume that calling means between the user U and the other party P is a mobile phone in the present embodiment; however, the present invention is not limited to this. Examples of the calling means include other types of mobile phones such as an automobile telephone, or an Internet telephone. That is, an entity that carries out transmission by relay need not always be the mobile phone service provider T.

Next, referring to FIG. 1, and FIGS. 3 through 11, the following will explain an information delivery system which realizes the foregoing information delivery service.

Figure 1:
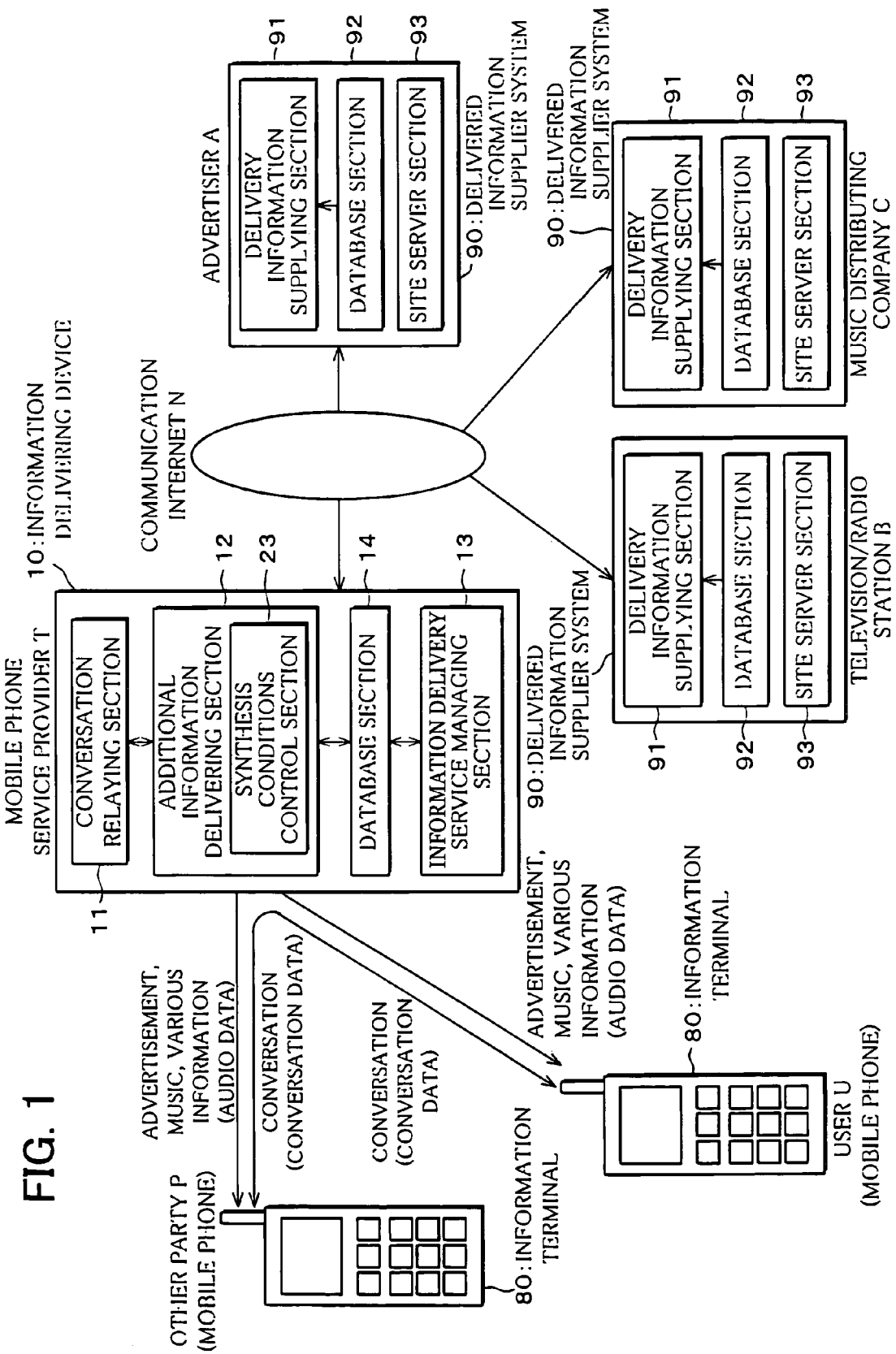
FIG. 1 is a functional block diagram schematically showing an information delivery system using an information delivering device shown in FIG. 3.

As shown in FIG. 1, the foregoing information delivery system includes information terminals 80 which are used by the user U and the other party P (the information terminal 80 used by the user U is "a first information terminal", and the information terminal 80 used by the other party P is "a second information terminal"). The system further includes an information delivering device 10 of the mobile phone service provider T, and information supplier systems 90 held by the information suppliers such as the advertiser A, the television/radio station B, and the music distributing company C.

Figure 4:
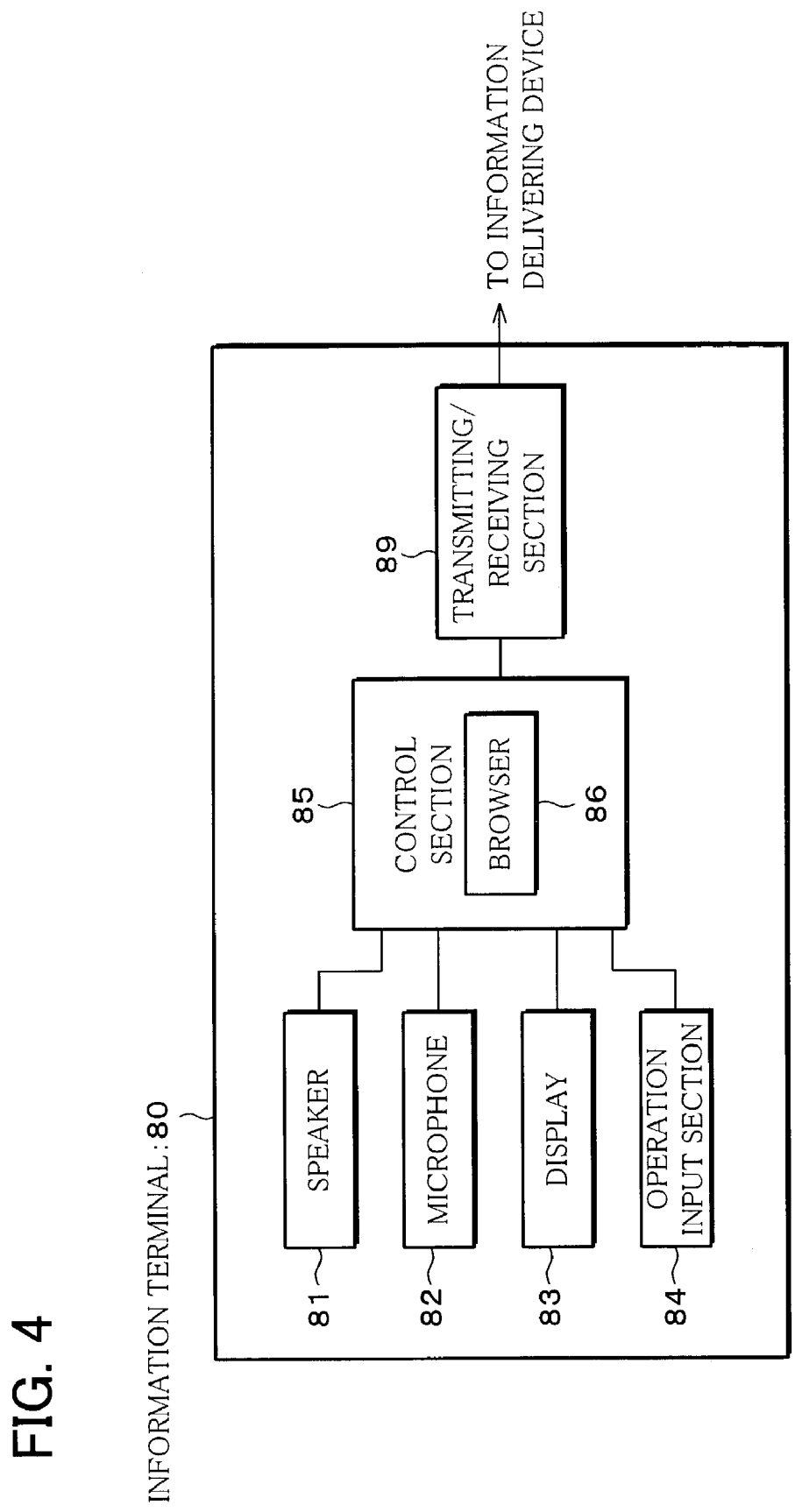
FIG. 4 is a functional block diagram schematically showing a configuration of an information terminal shown in FIG. 1.

First, as shown in FIG. 4, the information terminals 80 which are used by the user U and the other party P are mobile phones, or the like, which have a well-known structure. Specifically, the information terminal 80 includes at least a speaker 81, a microphone 82, a display 83, an operation input section 84, a control section 85, and a transmitting/receiving section 89. The information terminal 80 is subject to general control by the control section 85.

This allows the user U and the other party P to converse with each other by inputting/outputting their voices via the speaker 81 and the microphone 82. At this moment, the audio data of the conversation transmitted from the transmitting/receiving section 89 is relayed by a conversation relaying section 11 in the information delivering device 10 of the mobile phone service provider T.

Further, the user U and the other party P can input information other than voices, such as telephone numbers and other information, using the operation input section 84 such as key and dial buttons, and the display 83 such as LCD (liquid crystal display). The information terminal 80 is further provided with a browser 86, so that the user U and the other party P can access Web sites of the advertiser A, the television/radio station B, the music distributing company C, etc. to browse their homepages, using the operation input section 84 and the display 83.

Figure 3:
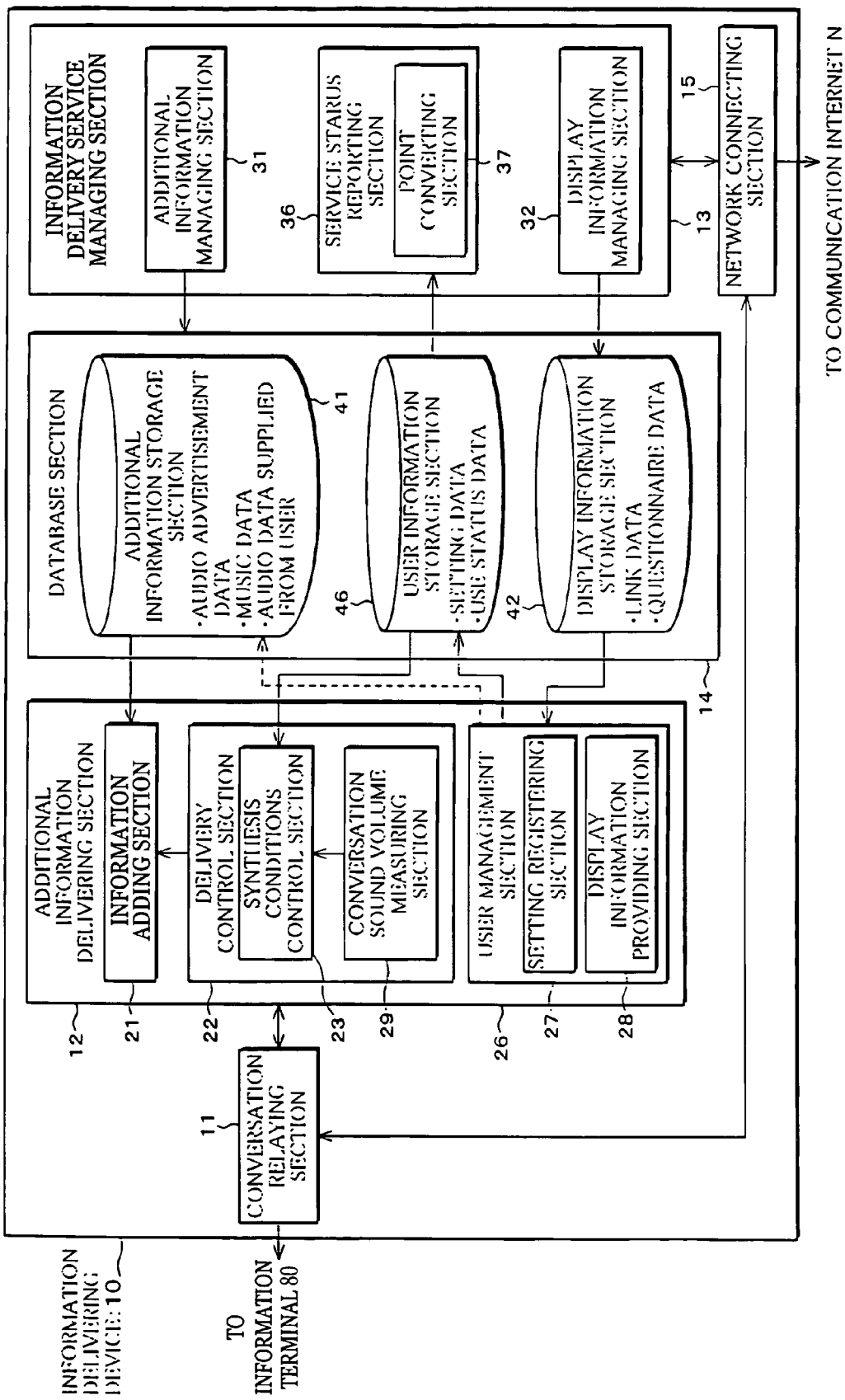
FIG. 3 is a functional block diagram schematically showing a configuration of an information delivering device according to one embodiment of the present invention.

Next, as shown in FIG. 3, the information delivering device 10 of the mobile phone service provider T, includes a conversation relaying section 11, additional information delivering section 12, an information delivery service managing section 13, a database section 14, and a network connecting section 15.

The conversation relaying section (conversation relaying means) 11, which is switching equipment, or the like, relays conversation data for a voice conversation between two information terminals 80. Namely, the conversation relaying section transmits conversation data that has been received from the information terminal 80 used by the user U to the information terminal 80 used by the other party P.

The additional information delivering section 12 includes an information adding section 21, a delivery control section 22, and a user management section 26.

While the conversation relaying section 11 relays the conversation data, the information adding section (audio adding means) 21 adds audio data to the conversation data sent at least in one direction by synthesizing and superposing the audio data and the conversation data so that they can be simultaneously reproduced. In the present embodiment, the information adding section 21 adds audio data to conversation data so that both the user U and the other party P, or only the user U, can hear information such as an advertisement or music.

More specifically, the information adding section 21, under the control of the delivery control section 22, adds (synthesizes) audio data such as advertisements and music, which are obtained from the additional information storage section 41, to conversation data relayed by the conversation relaying section 11 by superposing the audio data upon the conversation data so that an advertisement, music, etc. can be heard in the background of the conversation when the information terminal 80 receives the audio data. At this moment, the sound volume and frequency of the added audio data are controlled by a synthesis conditions control section 23.

The delivery control section 22 controls the operation of adding information to a conversation in accordance with setting data that has been preset and stored in the user information storage section 46. Here, examples of the setting data include a sound volume, frequency, content of audio data, and addition conditions such as an addition order of multiple audio data (if they exist), which are preset for each information terminal 80 (or the user U and the other party P) and stored in the user information storage section 46.

Especially, the delivery control section 22 includes the synthesis conditions control section 23 and a conversation sound volume measuring section 29. The synthesis conditions control section (volume control means, frequency control means) 23, in accordance with a conversation sound volume measured by the conversation volume measuring section 29, controls a sound volume and/or frequency of the audio data added to the conversation data in the information adding section 21, as described below.

The user management section 26 includes a setting registering section 27 and a display information providing section 28. The setting registering section 27 registers in the user information storage section 46 setting information (FIG. 7) about the user U who uses the information delivery service and setting information (FIG. 9) of the other party P. When the setting registering section 27 displays a setting screen on the display 83, a display information providing section 28 provides link data for accessing Web sites of the delivered information suppliers such as the advertiser A, the television/radio station B, and the music distributing company C and questionnaires from the delivered information suppliers. Note that, the display information providing section 28 may obtain display information, such as characters and images associated with additional information transmitted during a telephone conversation, from the display information storage section 42 in which the display information is stored in advance, and then, the display information providing section 28 may transmit the display information thus obtained to the information terminal 80 so that it is displayed on the display 83 of the information terminal 80.

The information delivery service managing section 13 includes an additional information managing section 31, a display information managing section 32, and a service status reporting section 36. Note that data exchange between the information delivery service managing section 13 and the delivered information supplier system 90 is carried out via the communication network N.

The additional information managing section (audio data obtaining means) 31 stores and manages in the additional information storage section 41, audio data, such as audio advertisement data and music data, which are provided by the delivered information suppliers such as the advertiser A, the television/radio station B, and the music distributing company C, so as to be added to the conversation data transmitted between the information terminals 80. Especially the additional information managing section 31 obtains the audio data via the network connecting section 15 in the case where the audio data added to the conversation by the information adding section 21 are obtained from the delivered information supplier system 90 every time the information adding section 21 adds the audio data to the conversation data, such as when the delivered information supplier system 90 is the television/radio station B.

The display information managing section 32 stores and manages in the display information storage section 42, display data, such as text and images for link data, questionnaire data, etc., which are provided by the information suppliers so as to be displayed appropriately on the display 83 of the information terminal 80.

The service status reporting section 36 reports on a delivery service use of the audio data. The audio data are provided by the delivered information suppliers such as the advertiser A, the television/radio station B, and the music distributing company C, to the delivered information supplier system 90 held by the above information suppliers. At this moment, a converting section 37 converts information such as a number of hours of use of the delivery service and a sound volume into a value such as an amount of money or points, so as to report it as information relating to the service offered to the user U. Note that converted data, such as an amount of money, may be used in the delivery control section 22, as information data to control the delivery operation.

The database section 14, which is an information storage device such as a hard disk, includes the additional information storage section 41, the display information storage section 42, and the user information storage section 46.

The additional information storage section (audio data storage means) 41 stores therein audio data such as audio advertisement data and music data, which are provided by the information suppliers such as the advertiser A, the television/radio station B, and the music distributing company C, so as to be added to the telephone conversation between the information terminals 80. Note that, in the case in which the user U desires to receive audio data, such as messages and music, which are prepared by the user U themselves, the additional information storage section 41 stores such audio data therein.

The display information storage section 42 stores therein display data such as text and images of link data and questionnaire data that are provided by the information suppliers.

The user information storage section 46 stores therein setting data associated with users, such as conditions for the information addition, which are necessary when the information delivery service is performed, and use status data such as use history of the information delivery service. The user information storage section 46 manages data for each user.

The network connecting section 15 is an interface device which is connected to the communication network N such as the Internet. This allows the information delivering device 10 to carry out data exchange with the delivered information supplier systems 90, etc., which are connected to the communication network N. Further, the information terminal 80 is connected to the communication network N through the conversation relaying section 11 and the network connecting section 15 in the information delivering device 10, which makes it possible to carry out data exchange with the delivered information supplier systems 90, etc.

Here, the information delivering device 10 includes a CPU (Central Processing Unit) which executes instructions from a program (information delivery program) for realizing the functions of the additional information delivering section 12, the information delivery service managing section 13, and the data base section 14; ROM (read only memory) which has a boot logic stored therein; RAM for use in running the above program; a storage device (recording medium), such as a hard disk, for storing the above program and various kinds of data; an input device such as keyboard and mouse; an output device such as monitor and speaker; a communication device for communicating with other devices; and so on. The information delivery program is computer-readably recorded in a recording medium including a media such as floppy disk, hard disk, magnetic disk, and CD-ROM/optical disk/magneto-optical disk/MD; and ROM/RAM memory.

Figure 5:
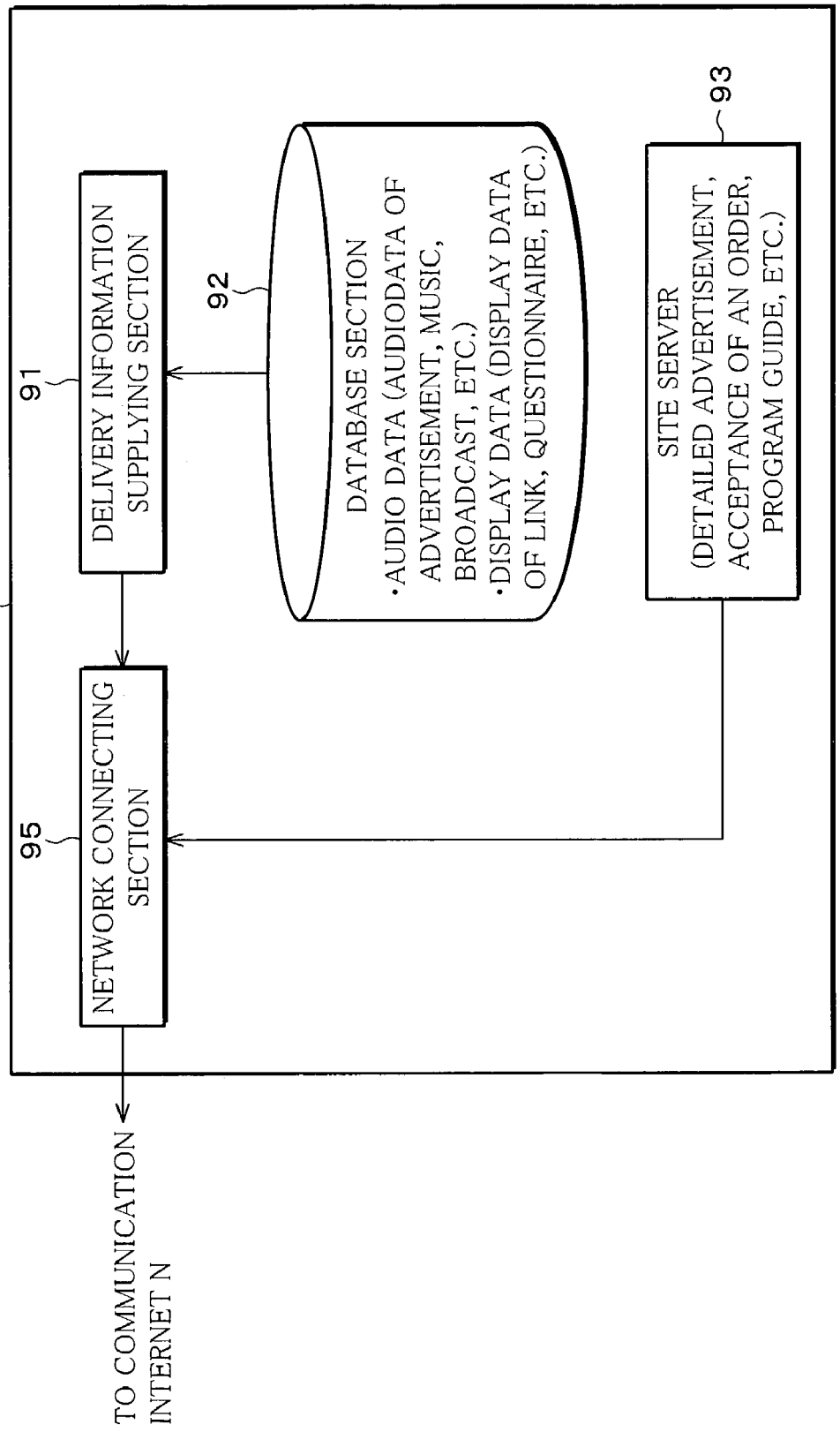
FIG. 5 is a functional block diagram schematically showing a configuration of a delivered information supplier system shown in FIG. 1.

Next, as shown in FIG. 5, the delivered information supplier system 90, which is held by the information suppliers including the advertiser A, the television/radio station B, and the music distributing company C, includes at least a delivery information supplying section 91, a database 92, a site server section 93, and a network connecting section 95.

The delivered information supplying section 91 obtains audio data, which is added to the conversation data in the information delivering device 10, and display data, which is transmitted so as to be presented on the information terminal 80, and transmits them via the communication network N from the network connecting section 95 to the information delivering device 10.

The database section 92 stores therein audio data such as advertisements, sound, and broadcasts, which are added to the conversation data in the information delivering device 10, and display data such as link information to the site server section 93 and questionnaires, which are transmitted so as to be presented on the information terminal 80.

The site server section 93 has files constituting a home page stored therein. The user U is guided to the home page by the audio data, which is added to the conversation data by the information delivering device 10, and link data, which is presented on the information terminal 80. The home page can provide the user U with detailed descriptions and order processing for the products featured in the advertisement, order processing for music data of all songs trial-listened to by the user U, program guides, etc.

The network connecting section 95 is an interface device which is connected to the communication network N such as the Internet. This allows the delivered information supplier system 90 to carry out data exchange with the information delivering device 10, which is connected to the communication network N. Further, the delivered information supplier system 90 can carry out data exchange with the information terminal 80, connecting to the communication network N through the information delivering device 10.

In addition, the delivered information supplier system 90 may be provided with related systems such as a marketing system using questionnaire results received from the information delivering device 10, an order-receiving system for processing orders received from the information delivering device 10, and a user support system using information delivered by the information delivering device 10.

Next, the following will explain processes performed in the information delivering device 10. When the conversation relaying section 11 relays conversation data between the information terminals 80 used by the user U and the other party P, the information adding section 21 synthesizes the conversation data with audio data which is read out from the additional information storage section 41, in accordance with setting data for the user U, and transmits the synthesized data to the user U. At this time, the information adding section 21 also synthesizes audio data for the other party P in accordance with the setting data for the user U. Incidentally, in the case when the other party P refuses a delivery of audio data during a conversation and when the other party P has preset a refusal so as to refuse a delivery of audio data, the information adding section 21 does not synthesize audio data with conversation data to the other party P. Further, in the case where setting data for the other party P is registered in the user information storage section 46, the delivery control section 22 carries out information delivery to the other party P in accordance with the setting data for the other party P. Note that, in the case in which the information terminal 80 is a mobile phone, the user (user U) of the information terminal 80 can be identified from a telephone number of a calling party.

Next, the following will explain the control by the synthesis conditions control section 23 of synthesis conditions when audio data is added to a conversation in the information adding section 21.

First, in the case where the user U hates to hear added audio data, which is an advertisement, etc., the synthesis conditions control section 23 synthesizes the audio data with the conversation in the order of 20 Hz, which is a frequency at which sound is inaudible for humans, and then delivers the synthesized data. This prevents the user U from hearing the audio data; however, a subliminal effect is expected. A delivery content using inaudible sound may be the same as that using audible sound, or may be content such as a message which is prepared exclusively for delivery by inaudible sound. Note that, at the step S44 (FIG. 7), i.e. at the time of checking a delivery content, audio data having content delivered using inaudible sound can be converted into audio data using audible sound so as to be subjected to a trial listening.

Figure 6:
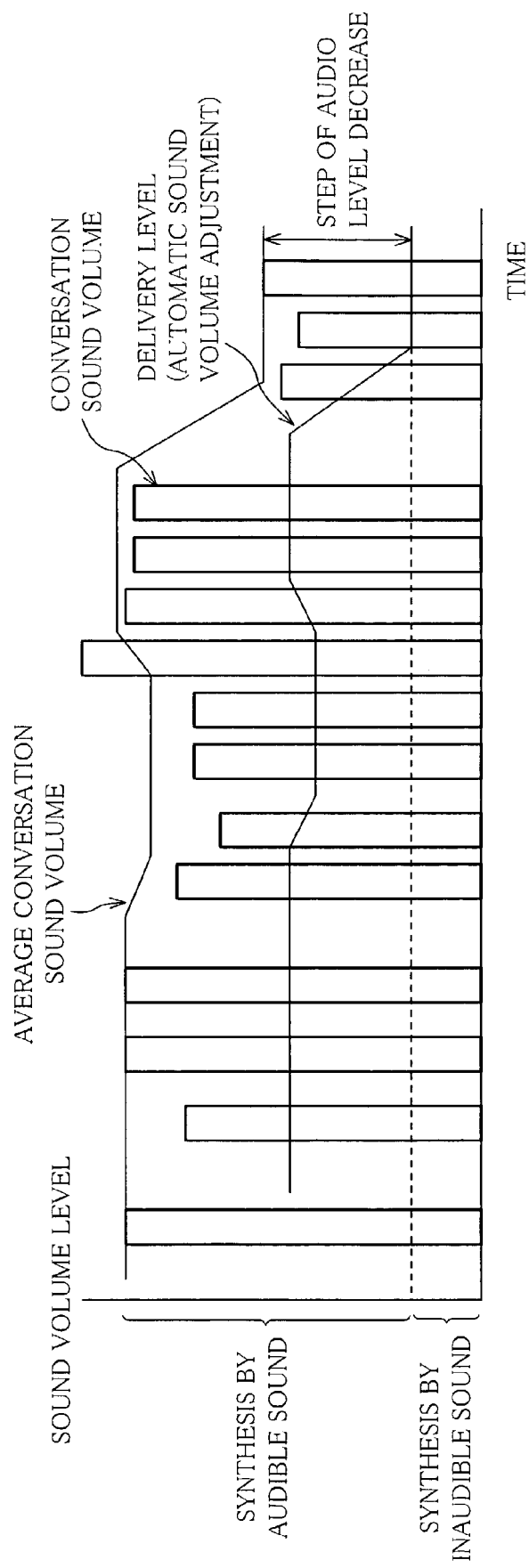
FIG. 6 is an explanatory view showing sound volume adjustment and frequency adjustment of audio data by the information delivery device shown in FIG. 3.

Next, referring to FIG. 6, the following will explain automatic volume setting performed by the synthesis conditions control section 23.

As shown in FIG. 6, the conversation sound volume measuring section 29 measures a sound volume of conversation data relayed by the conversation relaying section 11. For example, an average conversation sound volume is measured which is an average value of a conversation sound volume for a predetermined period of time (e.g. five seconds). Then, the sound volume of the audio data is automatically changed by the synthesis conditions control section 23 to follow this average conversation sound volume. That is, the synthesis conditions control section 23 changes a sound volume level of added audio data every time the average conversation sound volume for a predetermined period of time varies.

Further, the synthesis conditions control section 23 can automatically change a frequency of the added audio data from an audible sound to an inaudible sound (for example, 20 Hz or less). Such a change is effective for an advertisement delivery, for example. Note that, what steps a sound volume is decreased in, compared with the average conversation sound volume, can be preset by the user U.

Figure 7:
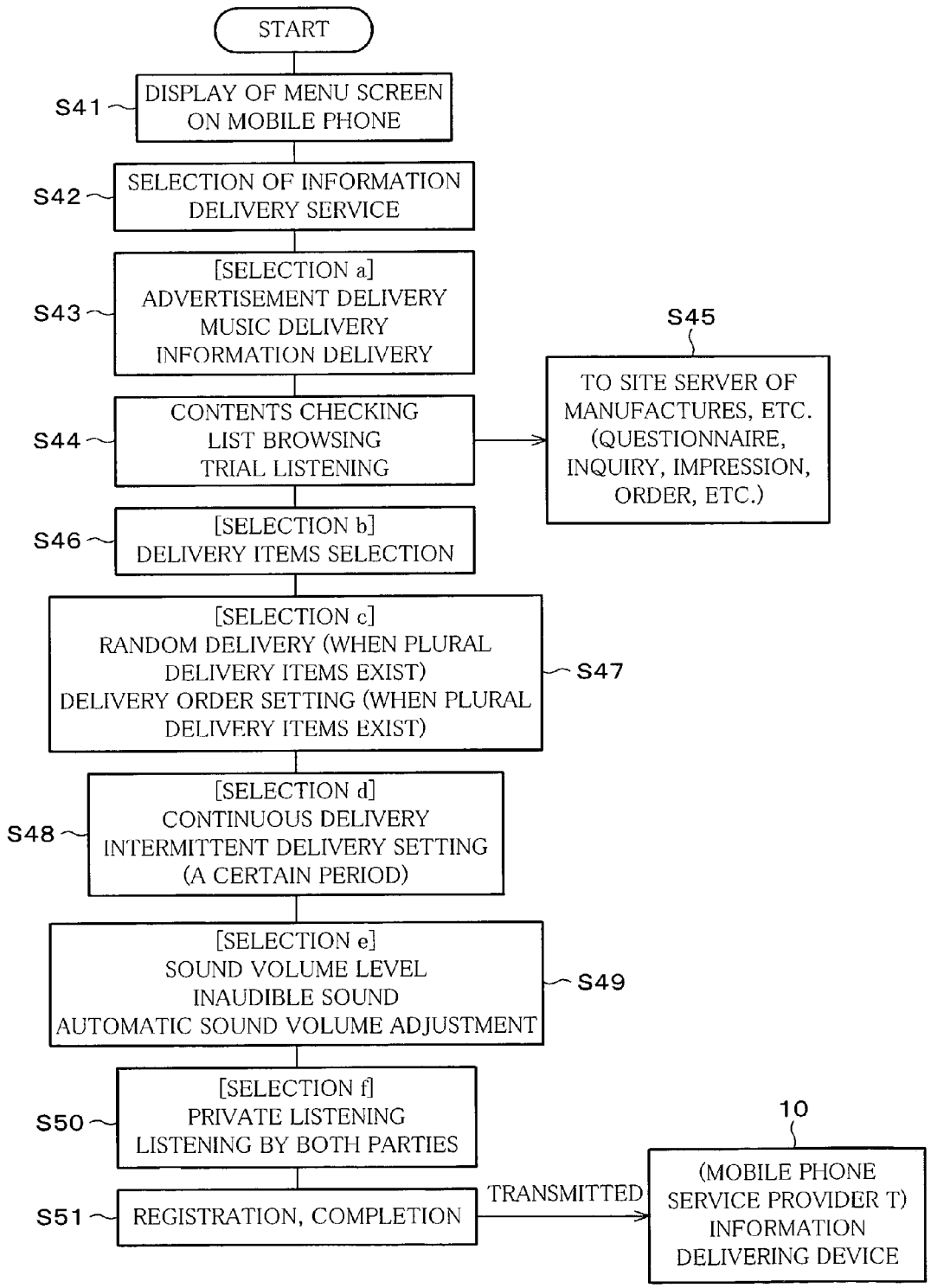
FIG. 7 is a flowchart showing steps for setting information for a user in the information delivery service of the information delivery system shown in FIG. 1.
Figure 8:
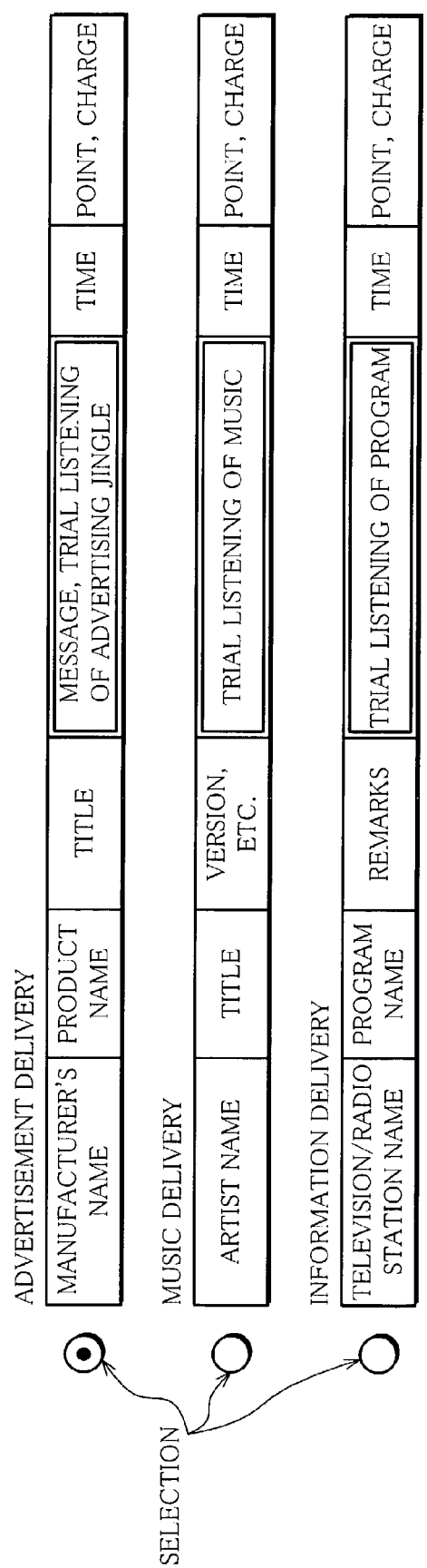
FIG. 8 is an explanatory view showing one example of a display screen presented on an information terminal during the setting for the user as shown in FIG. 7.

Referring to the flowchart in FIG. 7 and an example of a display screen in FIG. 8, the following will explain a setting registration by the user U.

First, the user U causes the information terminal 80 to display a menu screen (S41). Next, the user U selects a setting for information delivery service, which is preset as an item on the menu screen (S42).

On a setting screen for the information delivery service, the user U selects a type of delivery from advertisement delivery, music delivery, and information delivery in [selection a] (S43). At this moment, the user U can browse lists, perform trial listening, etc. in order to check details of the deliveries (S44). Note that, a fee (use fee) may be set by listening time, or for each song or each program.

For example, as shown in the display screen of FIG. 8, a list is displayed so that details of [selection a] can be browsed. Also, it is possible to select a plurality of items. Further, when "trial listening" is selected, the user U can take a short time trial listening to only a part of the audio data to be aired during a conversation. At this moment, a simple setting of sound volume (a level of audible sound) is possible. Note that, even in the case of audio data to be aired using inaudible sound, this trial listening can be carried out using audible sound.

Further, a link is set so that the user U can view a Web site of a manufacturer (advertiser A) when "manufacture's name" is clicked. This function can guide the user U to the site server section 93 of the advertiser A, etc. so that detailed descriptions can be viewed and processing of questionnaires, ordering, inquiries, etc. can be made by the user U, using a bi-directional communication such as communication via the Internet (S45).

Next, the user U selects delivery items in [selection b] (S46). More specifically, the user U causes a setting indicator, which is at the top of each item, to be lit up by clicking on the setting screen (in FIG. 8).

Subsequently, if a plurality of delivery items are selected at the step S46, it is selected whether delivered information is aired at random or in order in [selection c] (S47). Thereafter, whether delivery is continuous or intermittent is selected in [selection d], and when intermittent delivery is selected, an intermittent time is set (S48). Note that, in case of a delivery of information such as news programs and live sports programs of, steps S47 and S48 are skipped.

Finally, a sound volume, etc. is set (S49). Specifically, it is possible to set a sound volume level (e.g. five levels) of audible sound, inaudible sound, or use of automatic sound volume adjustment in [selection e]. Note that, in the case of delivery of information other than advertisements, it may be arranged so that the selection of inaudible sound is impossible.

Further, it is selected whether only the user U is to listen to the delivery information, or whether both the user U and the other party P are to listen in [selection f] (S50). Upon completion of all selections, the user U transmits a setting content to the information delivering device 10 of the mobile phone service provider T, thereby completing a setting registration.

Figure 9:
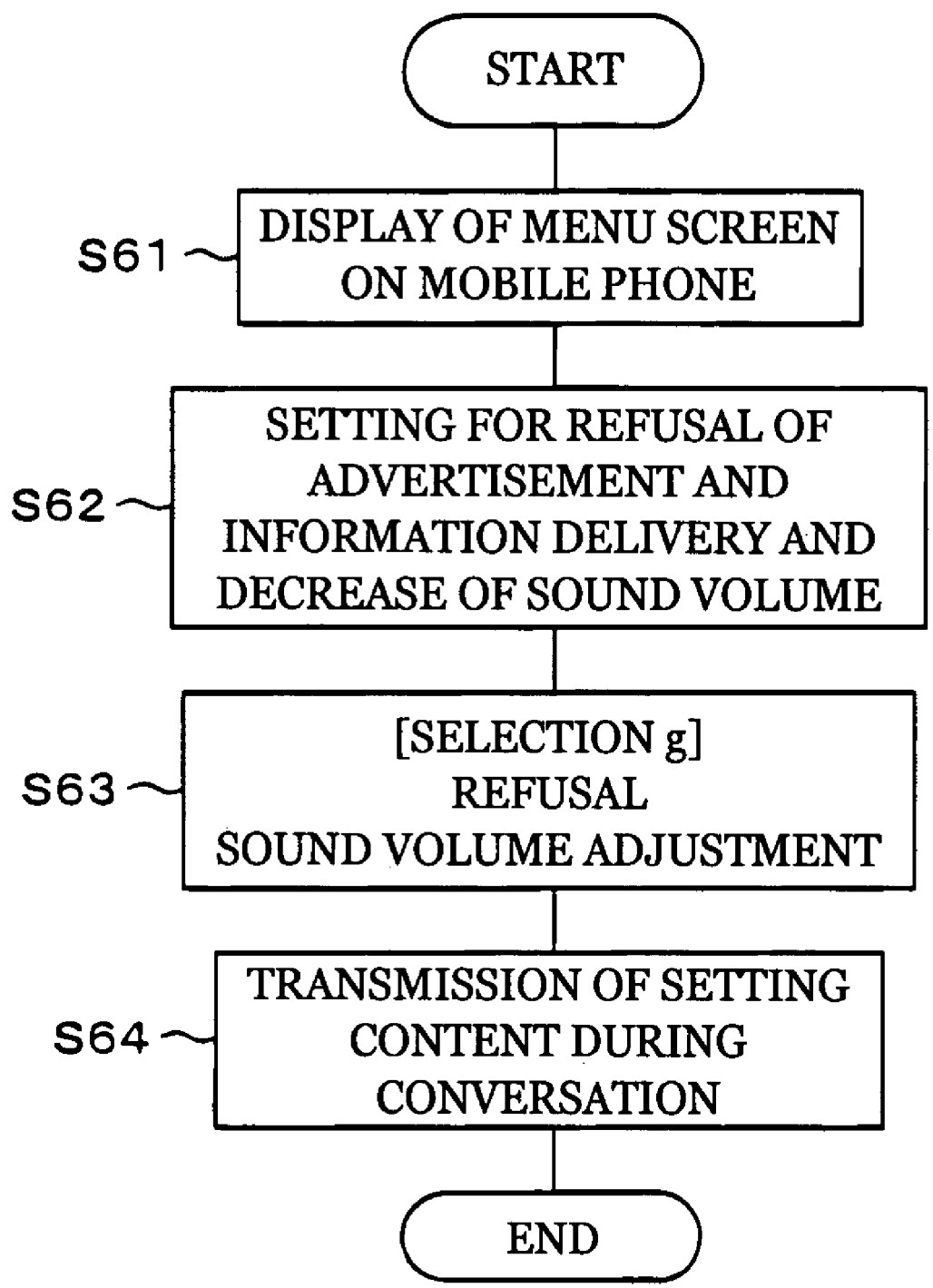
FIG. 9 is a flowchart showing steps for setting information for other parties in the information delivery service of the information delivery system shown in FIG. 1.

Next, referring to the flowchart in FIG. 9, the following will explain a setting registration by the other party P.

The other party P causes a menu screen to be displayed on the information terminal 80 (S61). Subsequently, the other party P selects a setting screen for information delivery service, which is preset as an item on the menu screen (S62). On the setting screen (not shown), it is possible to set a refusal of delivery of information such as advertisements and music and a sound volume adjustment in [selection g].

Note that, [selection c] to [selection f] and [selection g] can be set even during a conversation. In the above information delivery system, for a simple change of such a sound volume and setting content, a display on the information terminal 80 is arranged so that a setting for sound volume, etc. can be completed only with one display frame, or functions for setting are assigned beforehand to dial buttons of the information terminal 80. Further, a sound volume information, etc., which is set during a conversation, is transmitted along with conversation data to the information delivering device 10 of the mobile phone service provider T and is processed in the setting registering section 27 to become criteria for conversion for charge discounts, etc.

Figure 10:
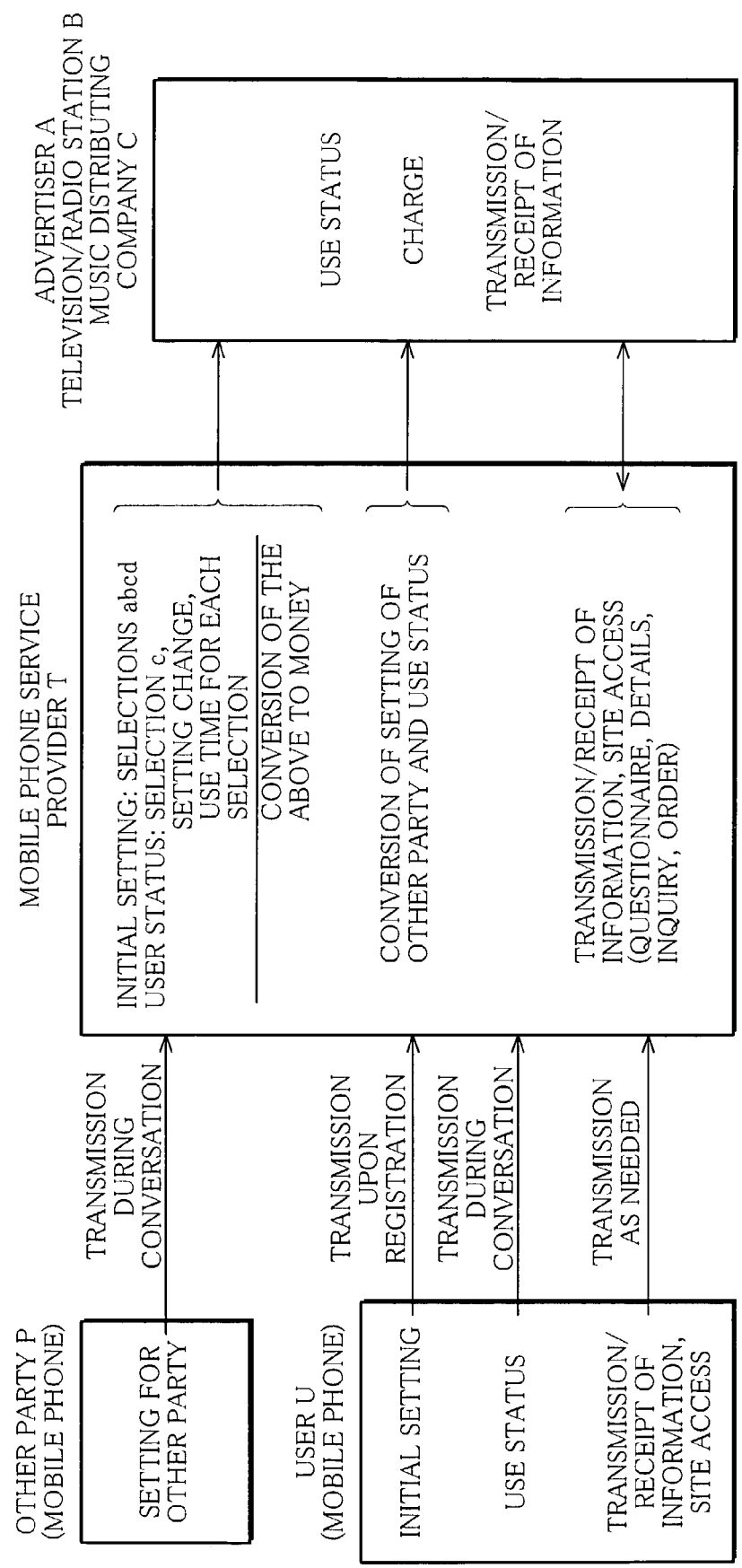
FIG. 10 is an explanatory view showing data flow in the delivered information supplier system shown in FIG. 1.

Next, referring to FIG. 10, the following will explain data flow among the devices of the information delivery system in FIG. 1.

In the mobile phone service provider T, the user management section 26 collects data such as various setting contents (initial settings, other party settings) and actual use status (use status, information transmission/receipt and site access history) via a mobile phone line from the information terminal 80. Data is collected at the time of transmission upon registration, at the time of transmission during a conversation, or every time information as needed is transmitted/received. The user management section 26 classifies the collected information into the respective categories for the user U and the other party P, which are stored in the user information storage section 46. Further, such data are converted into an amount of money by the converting section 37. The amount of money obtained, which is associated with the foregoing data, is stored in the user information storage section 46.

Further, data such as aggregate use status and charge, which are stored in the user information storage section 46, are daily transmitted via the Internet to the information supplier systems 90 such as the advertiser A, television/radio station B, and music distributing company C and finally registered in each of the database sections 92 (FIG. 5).

The access from the information terminal 80 to the sites (server section 93) of the advertiser A, television/radio station B, music distributing company C, etc. is made immediately through the Internet by the conversation relaying section 11 and the network connecting section 15 of the information delivering device 10. Note that, data for easy confirmation of contents in the communication, such as ordering, even by such an access to the sites may be stored in the database section 14.

Data such as the use status which is collected by the user management section 26, and the amount of money (points) which is converted by the converting section 37 in accordance with the foregoing data are aggregated again at fixed intervals, for example, on a monthly basis. In accordance with the result of aggregation, charge discounts and cashback are provided to the user U and other party P, and payment and charging to the advertiser A, television/radio station B, music distributing company C, etc.

Figure 11:
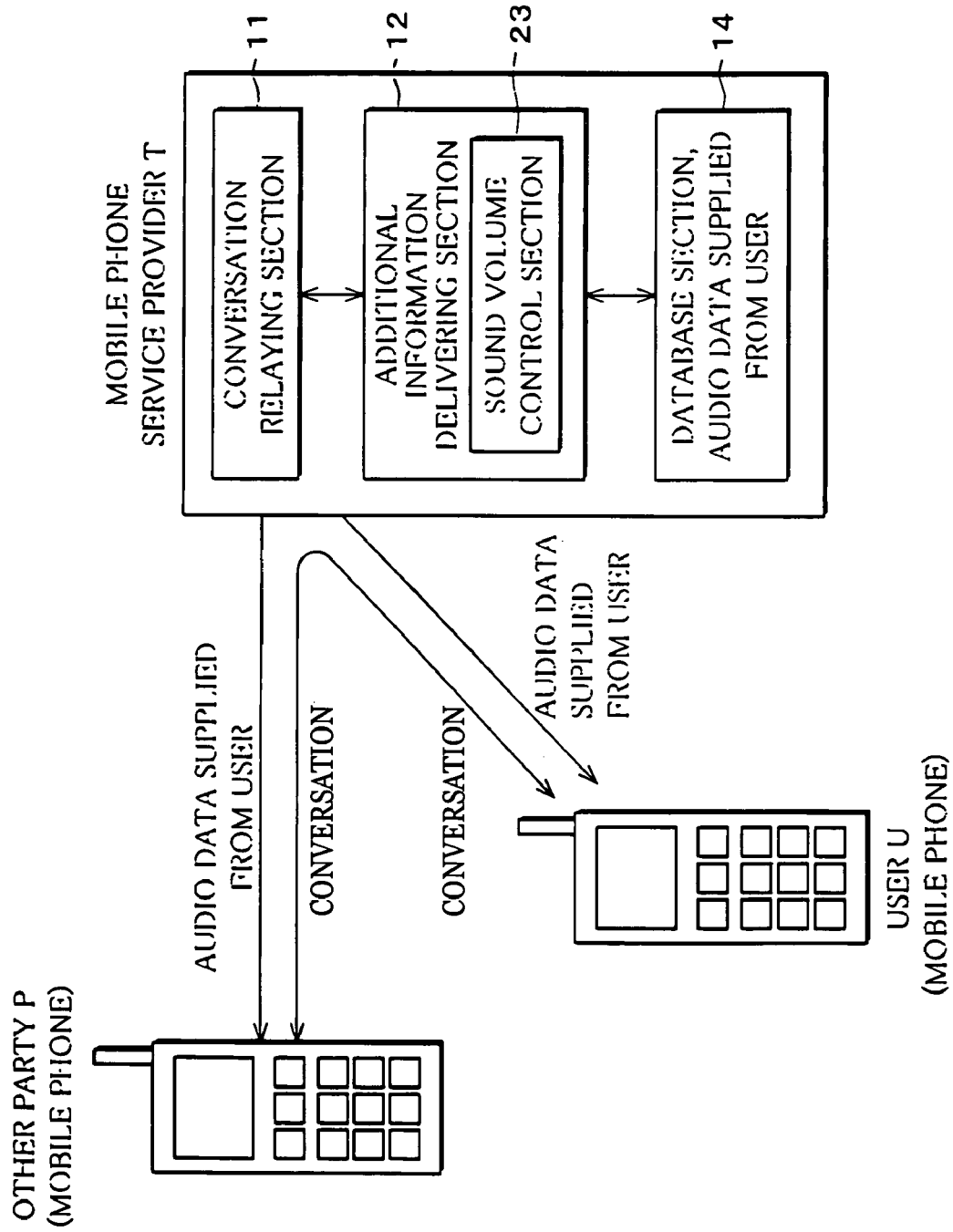
FIG. 11 is a functional block diagram showing another example of an information delivery system using the information delivering device shown in FIG. 3.

As shown in FIG. 11, in the above information delivering system, the user U can air a message, information, etc. for himself during a conversation.

In such a case, the user U previously registers various messages and information by audio input, etc. from the information terminal 80 to the database section 14 of the mobile phone service provider T. Specifically, in this service, the setting registering section (audio data obtaining means) 27 of the user management section 26 stores and manages audio data provided by the user U in the additional information storage section 41 (FIG. 3).

It is possible to set whether messages and information are listened to only by the user U or by both the user U and the other party P, and in case of listening only by the user U, the messages and information can be set so as to be aired by inaudible sound.

This makes it possible for the user U to listen to messages that should be transmitted securely to the other party and music of his own composition with the other party over the phone. In addition, it is possible to listen to messages of encouragement, etc. (self-suggestion) for himself and healing music.

Further, the messages can be started to air by pushing buttons, etc. of the user U's mobile phone. The use fee for the service is calculated by the used hours of the service and charged in addition to a charge for a call by the user U's mobile phone.

As described above, the information delivering method of the present embodiment includes the step of (a) relaying conversation data between first and second information terminals, the conversation data corresponding to a conversation between respective users of the first and second information terminals. The method further includes the step of (b) adding audio data to conversation data which is sent to at least in one of the first and second information terminals so that the audio data and the conversation data can be reproduced simultaneously by the at least one of the first and second information terminals, while the conversation data is relayed by the step (a).

Further, the information delivering device of the present embodiment includes conversation relaying means for relaying conversation data between first and second information terminals, the conversation data corresponding to a conversation between respective users of the first and second information terminals. The information delivering device further includes audio adding means for adding audio data to the conversation data so that the audio data and the conversation data can be reproduced simultaneously by one or both of the first and second information terminals, while the conversation relaying means relays the conversation data between the first and second information terminals.

Still further, in the information delivering device of the present embodiment, the audio adding means adds audio data to the conversation data so that the audio data and the conversation data can be reproduced simultaneously by both the first and second information terminals, while the conversation relaying means sends the conversation data between the first and second information terminals.

According to the above method and arrangement, when conversation data corresponding to a telephone conversation between a user of a mobile phone, or the like (a first information terminal) and another party (a second information terminal) are relayed by switching equipment, or the like in a mobile phone service provider, the conversation data sent in any one or both directions between the user and the other party is transmitted with separately prepared audio data which is added to the conversation data so that they can be reproduced simultaneously.

Therefore, it is possible to air additional information by sound, such as advertisements and music, like background music during a telephone conversation between mobile phones, etc. This allows additional information to be reproduced for an overwhelmingly long time as compared to the time period of receiving a call and holding a call, which makes it possible to air a lengthy advertisement or a plurality of advertisements for a certain period of time (during one telephone conversation). In addition, information terminals used by the user and other party need only include the same function as that of a conventional information terminal and do not require special functions.

In this respect, it was common conventionally that users disliked sound other than voices to be aired during a telephone conversation. Therefore, audio information, such as advertisements, was not aired like background music during a telephone conversation between users of mobile phones. However, even during a telephone conversation, the user usually enjoys listening to music, live sports broadcasts, news, etc. from a radio or compact disc player by his side. That is, information delivery during a telephone conversation was a blind spot in conventional advertising methods, but it has plenty of potential if a twist is added.

Further, according to the present embodiment, not only a user of a mobile phone, or the like but also another party can listen to information such as advertisements and music. In this respect, conventionally, only a user who receives an information delivery can listen to the information. However, the user sometimes wants to listen to music, live sports broadcasts, news, etc. with the other party during a telephone conversation.

As described above, according to the present embodiment, it is possible to deliver audio information, such as advertisements and music, to information terminals such as mobile phones in a flexible manner, which enables an information delivery service richer than ever before.

Further, in the information delivering device of the present embodiment, the audio adding means further comprises a sound volume control means for controlling a sound volume of the audio data added to the conversation data.

According to the above arrangement, it is further possible to turn down the sound volume of information such as advertisements and music to a sound volume at which the user does not feel uncomfortable. For example, a sound volume of audio data added to the conversation data may be automatically adjusted in accordance with an average conversation sound volume for a given length of time, which is measured by a conversation sound volume measuring means for measuring a sound volume of the conversation data.

Further, the information delivering device of the present embodiment further comprises: conversation sound volume measuring means for measuring a sound volume of the conversation data; and frequency control means for converting a frequency of the audio data added to the conversation data by the audio adding means into a frequency in an inaudible frequency band in a case when the sound volume of the conversation data, measured by the conversation sound volume measuring means, is at a predetermined level or less.

According to the above arrangement, in the case where a sound volume of conversation goes down to a certain level or less and information such as advertisements and music is aired using audible sound, a sound of audio data is switched to inaudible sound. This makes it possible to air information such as advertisements and music in such a manner that the user does not feel uncomfortable. Note that a subliminal effect is expected from reproduction using inaudible sound.

Further, in the information delivering device of the present embodiment, a frequency of the audio data added to the conversation data by the audio adding means is in an inaudible frequency band.

According to the above arrangement, it is further possible to air information so that the user does not feel uncomfortable even if the user hates to hear audio data, which is information such as advertisements, crossed with a telephone conversation. Note that a subliminal effect is expected from reproduction using inaudible sound.

Still further, in the information delivering device of the present embodiment, conditions for adding audio data are preset for each of the information terminals or for each user of the information terminals. The conditions for adding audio data are selected from a group including (i) a sound volume of, (ii) a frequency of, and (iii) a content of the audio data added to the conversation data by the audio adding means. The group also includes (iv) an addition order of plural audio data.

According to the above arrangement, it is further possible to deliver information that meets user's preferences because the conditions for audio addition, which are conditions for information delivery, are preset for each of the information terminals or for each of users of the information terminals. For example, this allows the user to set a sound volume and frequency. Also, in the case in which a plurality of pieces of information are aired for a certain period of time (during one telephone conversation), the user can determine the type, order, etc. of information before information is delivered to the user.

Further, the information delivering device of the present embodiment further comprises: audio data storage means for storing the audio data in advance, from which the audio adding means obtains the audio data to be added to the conversation data.

According to the above arrangement, it is further possible to perform information delivery by simple processing since information which is supplied in advance from information suppliers such as advertisers, music distributing companies, and television/radio stations can be stored, and the information is read out and delivered every time a conversation is held.

Further, the information delivering device of the present embodiment further comprises: audio data obtaining means for obtaining the audio data in advance and storing the audio data thus obtained in the audio data storage means, the audio data, to be added to the conversation data, being obtained from a user of an information terminal to which the audio data is to be transmitted.

According to the above arrangement, it is possible for the user to listen to the user's personal information (e.g. a message for himself) by audible sound or inaudible sound during a conversation with another party, either by himself or together with the other party.

Further, the information delivering device of the present embodiment further comprises: audio data obtaining means for obtaining the audio data from an external source every time the audio adding means is to add the audio data to the conversation data.

According to the above arrangement, it is further possible to deliver the latest information, since information for delivery can obtained, every time a conversation is held, from information suppliers such as advertisers, music distributing companies, and television/radio stations.

Further, an information delivery program of the present embodiment is a computer program for causing a computer to operate as means of the above information delivering device.

According to the above arrangement, it is possible to realize the above information delivering device by realizing the means of the information delivering device using a computer. This makes it possible to provide a more flexible information delivery service using a mobile phone, or the like.

Further, a computer-readable recording medium of the present embodiment contains an information delivery program recorded thereon for operating the information delivering device by causing a computer to realize means of the information delivering device.

According to the above arrangement, it is possible to realize the information delivering device on a computer using an information delivery program which is read out from the above recording medium.

Note that, the present embodiment is not intended to limit the scope of the present invention. Still other variations are possible within the scope of the present invention, and the present invention can be arranged as follows.

An information delivering method of the present invention may be a method for airing various information, such as advertisements and music, using audible sound during a conversation between users of mobile phones. This makes it possible to provide information such as advertisements and music during the conversation. Therefore, a long advertising time can be secured, so that a plurality of advertisements can be aired. This can provide advertisement information rich in content over the mobile phone.

An information delivering method of the present invention may be a method for airing various information, such as advertisements and music, using inaudible sound during a conversation between users of mobile phones. This makes it possible to turn down the sound volume of the information such as advertisements and music to a sound volume at which the user does not feel uncomfortable.

A system for automatically adjusting an advertisement sound volume of the present invention may be arranged such that a sound volume of an advertisement using audible sound may be automatically adjusted in accordance with an average of the conversation sound volume over a given length of time, or a sound of the advertisement is switched to inaudible sound in the case in which the sound volume of the conversation goes down to a certain level or less. This makes it possible to turn down the sound volume of the information such as advertisements and music to a sound volume at which the user does not feel uncomfortable.

An information delivery system of the present invention may be arranged such that not only a user but also another party can listen to information such as advertisements and music. This allows the user to listen to information, such as advertisements and music, together with the other party during a conversation, although conventionally such information could only be listened to by the user. Therefore, the other party also becomes a target for advertising.

An advertisement receiving method of the present invention may be a user-initiated advertisement receiving method in which the user can select types and items of information such as advertisements and music. This allows the user to determine the type, order, etc. of a plurality of pieces of information such as advertisements and music before information is delivered to the user, so that the user can listen to a plurality of pieces of information that meet user's preferences. In this respect, a conventional advertisement, which was an unsolicited advertisement provided by an advertiser considering a user's preferences, was intrusive to a user.

An advertisement receiving method of the present invention can set a simultaneous receipt of a plurality of pieces of information, such as advertisements and music, and may be further arranged so that an order of listening to the information can be set. This makes it possible to air plural advertisements for a certain period of time (during one telephone conversation) during an overwhelmingly long time of conversation as compared to the time period of receiving a call and holding a call. Moreover, the user can determine the type, order, etc. of the plurality of pieces information such as advertisements and music before information is delivered to the user, so that the user can listen to a plurality of pieces of information that meet the user's preferences.

An information delivery service of the present invention may be a service in which a user can listen to a private message by audible sound or inaudible sound by himself through a mobile phone during a conversation with another party.

Further, according to the present invention, it is possible to set a service of discounts on call charges for a user who listens to information such as advertisements and music and/or answer questionnaires. The questionnaires can be completed using a connection between the user and advertiser, etc. via the Internet, for example. Specifically, the present invention can be further arranged as follows.

An information delivery system of the present invention may provide a user a discount upon the purchase of products featured in an advertisement, music CDs, etc., depending on a sound volume and length of time for listening to information such as an advertisement or music. Further, cashback, etc. may also be provided in the system. This produces advantages such as discounts and/or cashback when the user purchases advertised products and/or music.

An information delivery method of the present invention may be a bidirectional information delivering method, providing not only information such as advertisements and music but also performing questionnaires and ordering. Therefore, it is possible to readily grasp reactions and effects caused by the advertisement since checking a status of listening by a user, handling user inquiries and orders, and performing questionnaires, etc. can be done readily.

An information delivery system of the present invention may be arranged so that information on effects such as use status of information (advertisements and music) and order status can be transmitted via the Internet to a source such as an advertiser. Therefore, it is possible to readily understand reactions and effects caused by the advertisement, since checking a status of listening by a user, handling user inquiries and orders, and performing questionnaires, etc. can be done readily. In this respect, conventionally, it took time and trouble for an advertiser to know by what medium an advertisement caused great reactions and effects because there are few methods for making such a determination.

An information delivery system of the present invention may determine an advertising rate and user fee in accordance with a status of listening, the number of orders, etc. This makes it possible to provide a system for determining an advertising rate in accordance with a status of listening and orders.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An information delivering method comprising the steps of:
    (a) relaying conversation data between first and second information terminals, the conversation data corresponding to a conversation between respective users of the first and second information terminals;
    (b) adding audio data to conversation data which is sent to at least one of the first and second information terminals so that the audio data and the conversation data can be reproduced simultaneously by the at least one of the first and second information terminals, while the conversation data is relayed by the step (a);
    (c) measuring a sound volume of the conversation between the users; and
    (d) varying a characteristic of the audio data added to the conversation data based on the measured sound volume.

2. The information delivering method according to claim 1, further comprising:
    adding display data to the conversation data.

3. An information delivering device comprising:
    a conversation relaying section for relaying conversation data between first and second information terminals, the conversation data corresponding to a conversation between respective users of the first and second information terminals;
    an audio adding section for adding audio data to the conversation data so that the audio data and the conversation data can be reproduced simultaneously by one or both of the first and second information terminals, while the conversation relaying section relays the conversation data between the first and second information terminals;
    a conversation sound volume measuring section for measuring a sound volume of the conversation data; and
    a frequency control section for converting a frequency of the audio data added to the conversation data by the audio adding section into a frequency in an inaudible frequency band in a case in which the sound volume of the conversation data, measured by the conversation sound volume measuring section is at a specified level or less.

4. The information delivering device according to claim 3, wherein the audio adding section adds audio data to the conversation data so that the audio data and the conversation data can be reproduced simultaneously by both the first and second information terminals, while the conversation relaying section relays the conversation data between the first and second information terminals.

5. The information delivering device according to claim 3, wherein the audio adding section further comprises a sound volume control section for controlling a sound volume of the audio data added to the conversation data.

6. The information delivering device according to claim 3, wherein
conditions for adding audio data are preset for each of the information terminals or for each user of the information terminals, and
the conditions for adding audio data are selected from a group including (i) a sound volume of, (ii) a frequency of, and (iii) a content of the audio data which is added to the conversation data by the audio adding section, the group further including (iv) an addition order of plural audio data.

7. The information delivering device according to claim 3, further comprising:
an audio data storage section for storing the audio data in advance, from which the audio adding section obtains the audio data to be added to the conversation data.

8. The information delivering device according to claim 7, further comprising:
an audio data obtaining section for obtaining the audio data in advance and storing the audio data thus obtained in the audio data storage section,
the audio data, to be added to the conversation data, being obtained from a user of an information terminal to which the audio data is to be transmitted.

9. The information delivering device according to claim 3, further comprising:
an audio data obtaining section for obtaining the audio data from an external source every time the audio adding section is to add the audio data to the conversation data.

10. The information delivering device according to claim 3, further comprising:
a display adding section for adding display data to the conversation data.

11. An information delivery program, encoded on a computer-readable medium, for causing a computer to act as an information delivery device comprising:
a conversation relaying section for relaying conversation data between first and second information terminals, the conversation data corresponding to a conversation between respective users of the first and second information terminals;
an audio adding section for adding audio data to the conversation data so that the audio data and the conversation data can be reproduced simultaneously by one or both of the first and second information terminals, while the conversation relaying section relays the conversation data between the first and second information terminals;
a sound volume measuring section for measuring a sound volume of the conversation between the users; and
a control section for varying a characteristic of the audio data added to the conversation data based on the sound volume measured by the sound volume measuring section.

12. The information delivery program according to claim 11, wherein the audio adding section adds audio data to the conversation data so that the audio data and the conversation data can be reproduced simultaneously by both the first and second information terminals, while the conversation relaying section relays the conversation data between the first and second information terminals.

13. The information delivery program according to claim 11, further comprising:
a display adding section for adding display data to the conversation data.

14. A computer-readable recording medium containing an information delivery program for causing a computer to act as an information delivery device comprising:
a conversation relaying section for relaying conversation data between first and second information terminals, the conversation data corresponding to a conversation between respective users of the first and second information terminals;
an audio adding section for adding audio data to the conversation data so that the audio data and the conversation data can be reproduced simultaneously by one or both of the first and second information terminals, while the conversation relaying section relays the conversation data between the first and second information terminals;
a sound volume measuring section for measuring a sound volume of the conversation between the users; and
a control section for varying a characteristic of the audio data added to the conversation data based on the sound volume measured by the sound volume measuring section.

15. The computer-readable recording medium according to claim 14, wherein the audio adding section adds audio data to the conversation data so that the audio data and the conversation data can be reproduced simultaneously by both the first and second information terminals, while the conversation relaying section relays the conversation data between the first and second information terminals.

16. The computer-readable medium according to claim 14, wherein the information delivering device, further comprises:
a display adding section for adding display data to the conversation data.

17. An information delivery device comprising:
a conversation relaying section for relaying conversation data between first and second information terminals, the conversation data corresponding to a conversation between respective users of the first and second information terminals;
an audio adding section for adding audio data to the conversation data while the conversation relaying section relays the conversation data between the first and second information terminals so that the audio data and the conversation data can be reproduced simultaneously by one or both of the first and second information terminals;
a sound volume measuring section for measuring a sound volume of the conversation between the users; and
a control section for varying a characteristic of the audio data added to the conversation data based on the sound volume measured by the sound volume measuring section.

18. The information delivery device according to claim 17, wherein the control section varies the volume of audio corresponding to the audio data based on the sound volume measured by the sound volume measuring section.

19. The information delivery device according to claim 17, wherein the control section varies a frequency of audio corresponding to the audio data based on the sound volume measured by the sound volume measuring section.

20. The information delivering device according to claim 17, further comprising:
a display adding section for adding display data to the conversation data.

21. An information delivery device comprising:
a conversation relaying section for relaying conversation data between first and second information terminals, the conversation data corresponding to a conversation between respective users of the first and second information terminals; and
an audio adding section for adding audio data to the conversation data while the conversation relaying section relays the conversation data between the first and second information terminals so that the audio data and the conversation data can be reproduced simultaneously by one or both of the first and second information terminals,
wherein a billing charge for the conversation to one or both of the users is based at least in part on a characteristic of the audio data added to the conversation data by the audio adding section.

22. The information delivery device according to claim 21, wherein the billing charge for the conversation to one or both of the users is based at least in part on the volume of audio corresponding to the audio data added to the conversation data.

23. The information delivery device according to claim 21, wherein the billing charge to one or both of the users for the conversation is based at least in part on the length of time that the audio data is added to the conversation data.

24. The information delivering device according to claim 21, further comprising:
a display adding section for adding display data to the conversation data.

25. The information delivering device according to claim 21, further comprising:
a sound volume measuring section for measuring a sound volume of the conversation between the users; and
a control section for varying a characteristic of the audio data added to the conversation data based on the sound volume measured by the sound volume measuring section.

26. The information delivery device according to claim 21,
wherein the first and second information terminals are mobile terminals, and
wherein the conversation data corresponds to an audio conversation between the respective users of the first and second mobile information terminals.

* * * * *